United States Patent
Schuler et al.

(10) Patent No.: US 6,189,635 B1
(45) Date of Patent: Feb. 20, 2001

(54) POLYURETHANE/POLYUREA ELASTOMER COATED STEEL BATTERY BOX FOR HYBRID ELECTRIC VEHICLE APPLICATIONS

(75) Inventors: Nathan L. Schuler; Jeffrey D. Jenks; Michael P. Lasecki, all of Fort Wayne; Harl Donley, Woodburn, all of IN (US)

(73) Assignee: Navistar International Transportation Corp., Chicago, IL (US)

( * ) Notice: Under 35 U.S.C. 154(b), the term of this patent shall be extended for 0 days.

(21) Appl. No.: 09/041,362

(22) Filed: Mar. 9, 1998

(51) Int. Cl.⁷ .................................................. B60R 16/04
(52) U.S. Cl. ...................... 180/68.5; 180/65.1; 180/65.2; 429/61; 429/164
(58) Field of Search ................................ 180/68.5, 65.2, 180/65.1; 429/164, 61

(56) References Cited

U.S. PATENT DOCUMENTS

| | | | |
|---|---|---|---|
| 4,126,734 | * | 11/1978 | Walters .................................... 429/71 |
| 4,129,194 | * | 12/1978 | Hammond et al. ................... 180/68.5 |
| 4,317,497 | * | 3/1982 | Alt et al. .............................. 180/68.5 |
| 4,854,540 | * | 8/1989 | Balek ..................................... 248/503 |
| 5,378,555 | * | 1/1995 | Waters et al. ........................... 429/97 |
| 5,390,754 | * | 2/1995 | Masuyama et al. ................. 180/68.5 |
| 5,534,364 | * | 7/1996 | Watanabe et al. ...................... 429/61 |
| 5,547,160 | * | 8/1996 | Johnson ................................. 248/503 |
| 5,558,949 | * | 9/1996 | Iwatsuki et al. ........................ 429/99 |
| 5,559,420 | * | 9/1996 | Kohchi ..................................... 320/2 |
| 5,620,057 | * | 4/1997 | Klemen et al. ..................... 180/68.5 |

* cited by examiner

Primary Examiner—Brian L. Johnson
Assistant Examiner—Deanna Draper
(74) Attorney, Agent, or Firm—Jeffrey P. Calfa; Dennis Kelly Sullivan; Gilberto Hernandez

(57) ABSTRACT

A battery box with a lid and a tray assembly for batteries for a hybrid electric vehicle. The lid and tray assembly are made of steel with an internal and external spray coating of an elastomer with high electrical resistance properties. Batteries are mounted in the tray assembly and enclosed by the lid. The elastomer coating on the tray assembly and the lid provides a non-electrically conductive interior and exterior surface for increased service safety. The steel base material of the tray assembly and the lid provides shielding from electromagnetic interference and radio frequency interference associated with the high voltages required to operate electric motors in hybrid electric vehicles. Additionally, the tray assembly has vents designed to optimize cooling of the batteries.

17 Claims, 3 Drawing Sheets

POLYURETHANE/POLYUREA ELASTOMER COATED STEEL BATTERY BOX FOR HYBRID ELECTRIC VEHICLE APPLICATIONS

BACKGROUND OF THE INVENTION

The present invention relates to a container to hold batteries for a mobile vehicle, such as a hybrid electric vehicle. More specifically, the container is made of a sturdy steel construction ant coated both internally and externally with a substance with high electrical resistance elastomer such as a combination polyurethane and polyurea elastomer. The use of the high electrical resistance elastomer coating allows the use of a steel container with reduced electrical shorting dangers. Steel is a preferred base material for the container or box because it is effective in providing shield for electromagnetic interference (EMI) and radio frequency interference (RFI) that is associated with the high voltage electricity running through batteries in hybrid electric vehicles.

PRIOR ART

Heretofore, battery containers or boxes for hybrid electric and electric vehicles were either made of materials other than steel or made of steel with complex electrical insulation insert assemblies. The battery boxes which were made of materials other than steel did not have the strength properties of a steel box nor did these non-steel boxes have the EMI and RFI shielding properties possessed by a steel box. Electric vehicles and hybrid electric vehicles have relatively large electric motors which at times run on high voltage electricity. A hybrid electric vehicle has as generating engine which is normally operating and providing a charging current to the batteries in the battery box. The hybrid electric vehicle draws current from these batteries to energize the motor in order to propel the vehicle. Since the generating engine is constantly running there is a continuous, electric current running to the batteries. The voltages range from 360 Volts to 552 Volts. These high voltages result in nearly continuous EMI and RFI effects. As a primary use of a hybrid electric vehicle is as a city delivery truck, the resulting EMI and RFI could be disruptive to electronic equipment possessed by the truck driver or nearby pedestrians.

At least one prior art battery box for an electric vehicle used a steel box with a complex insulation insert. The use of an insulation insert significantly added to the complexity of battery inspection and maintenance as both the external box and the insulation insert needed to be opened to access the batteries.

Heretofore, a battery box for a hybrid electric vehicle has not been suggested which has a steel base metal for EMI and RFI shielding with a coating of an elastomer with high electrical resistance properties.

SUMMARY OF THE INVENTION

Accordingly, it is a primary object of the invention to provide a battery box or container for batteries for a hybrid electric vehicle which is made of steel with an internal and external coating of an elastomer with high electrical resistance properties. The battery box generally consists of a tray assembly and a lid. The elastomer coating on the tray assembly and the lid provides a non-electrically conductive interior and exterior surface for increased service safety. The steel base material of the tray assembly and the lid provides EMI and RFI shielding. Additionally the steel base construction provides a very durable container required for hybrid electric truck applications.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
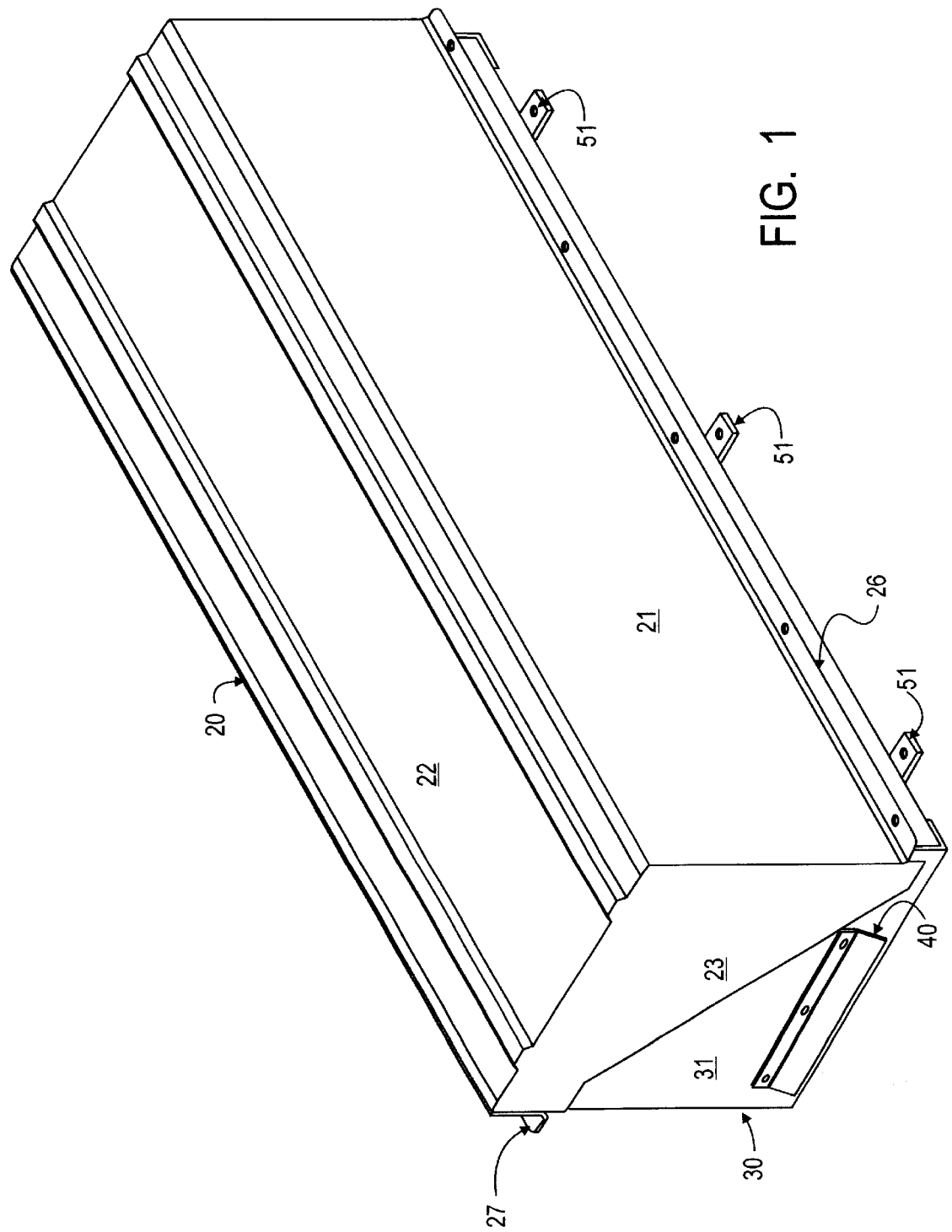
FIG. 1 is a front perspective view of a battery box made in accordance with this invention with a lid installed.
Figure 2:
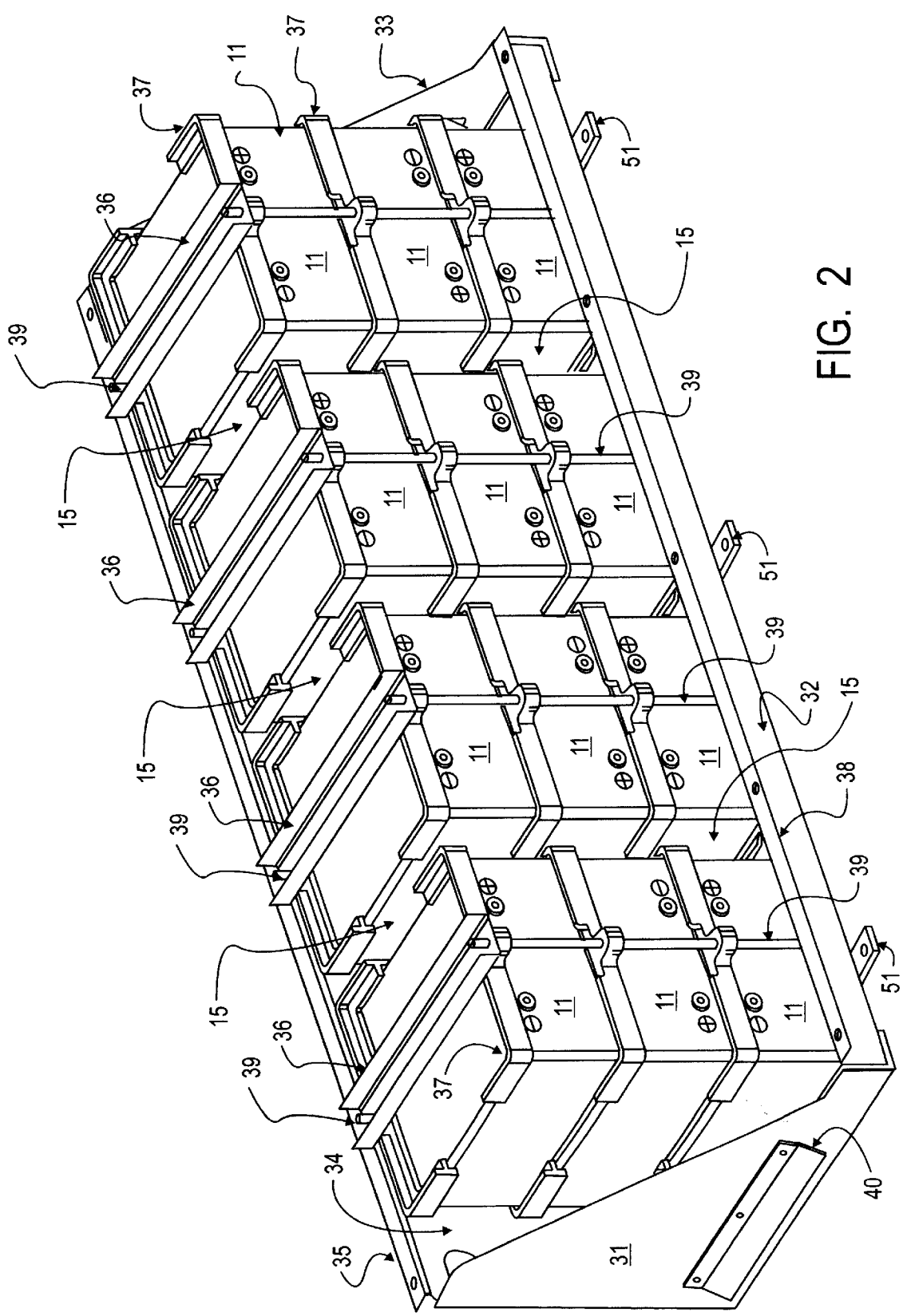
FIG. 2 is a front perspective view of the battery box of FIG. 1 with the lid removed and batteries installed.
Figure 3:
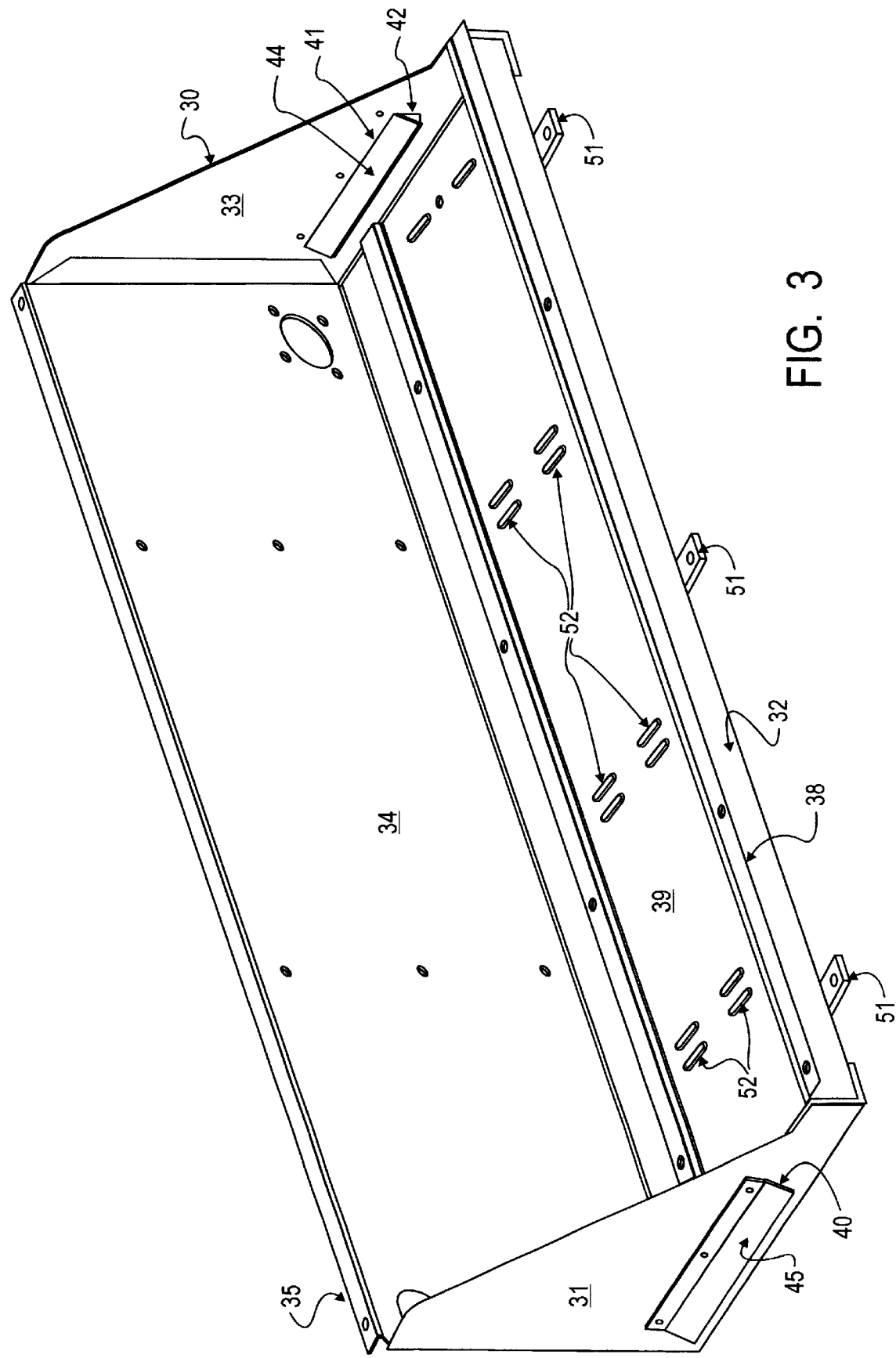
FIG. 3 is a front perspective view of the battery box of FIG. 1 with the lid removed and no batteries installed.

Referring now to the drawings in greater detail, in FIGS. 1 to 3, there is shown a battery box 10 made in accordance with this invention. The battery box 10 is installed to a vehicle 101 (not shown). The vehicle 101 has a chassis 102 (not shown) with two frame rails 103 (not shown). The frame rails 104 have 'L' shaped brackets 104 (not shown) installed for engagement to the battery box 10.

The battery box 10 has four principle components: a tray assembly 30; a lid or upper cover piece 20; vent covers 40; and a means 51 for attaching the battery box 10 to the brackets 104 on the frame rail 103. The lid 20 and the tray assembly 30 are made of steel and are coated with an elastomer 19 (not shown) with a high electrical resistance. The preferred elastomer coating 19 is Arma 952, an ARMA COATINGS® Polyurethane/Polyurea spray elastomer. Arma 952 is a combination of Polyurethane and Polyurea elastomers and is sprayed on both the internal and the external surfaces of both the lid 20 and the tray assembly 30 to a thickness from approximately one sixteenth of an inch ($\frac{1}{16}$") to one eighth of an inch ($\frac{1}{8}$") coating. The $\frac{1}{16}$" to $\frac{1}{8}$" coating thickness for the elastomer 19 is optimum for durability, electrical insulation, and EMI/RFI shielding. The elastomer coating 19 will not chip or rust from standard road debris like typical painted surfaces.

The Polyurethane/Polyurea elastomer (Arma 952) provides a flexible but extremely tough monolithic membrane which provides excellent abrasion and chemical resistance.

The tray assembly 30 is comprised of: a horizontal bottom shelf 39, a vertical forward face 31 a front face 32, a vertical rear face 33, and a vertical back side 34. Batteries 11 with a fixed height are installed on the tray assembly 30. The bottom shelf 39 contains drain holes 52 that prevent the battery box 10 from filling with water should rain leakage occur. A forward vent 43 (not shown) and a rear vent 42 are placed on the forward face 31 and on the rear face 33, respectively, of the tray assembly 30. If the holes 52 become plugged, the forward vent 43 and the rear vent 42 are lower than the fixed height of the batteries 11 installed directly on the bottom shelf 39 and hence lower than terminals 12 (not shown) on the batteries 11. Any intruding water would drain out of the forward vent 43 and the rear vent 42 before an electrical short would occur from the batteries 11 to ground. The vertical back side 34 has a back mating flange 35 and the front face 32 has a front mating flange 38. The back mating flange 35 and front mating flange 38 are for engagement to the lid 20. The attachment to frame rail bracket means 51 may be steel attachment plates 51 which are welded to the tray assembly 30 for engagement to the brackets 103 of the frame rail 102.

The lid 20 is designed to be installed over the tray assembly 30 to enclose the batteries 11. The lid 20 has a top face 22, an outward side face 21, a front face 23, a back face 24 (not shown), and an inward side face 25 (not shown). The outward side face 21 has an outward mating flange 26 and the inward side face 25 has an inward mating flange 27. The outward mating flange 26 and the inward mating flange 27 of the lid 20 are engaged to the front mating flange 38 and the back mating flange 35, respectively of the tray assembly 30 to enclose the batteries 11. Security headed fasteners 61 (not shown) are used for the engagement of the lid 20 to the tray assembly 30. The security headed fasteners 61 require a special tool to be removed hence making the batteries 11 less susceptible to tampering. Certified technicians would be provided with the special tool.

The forward vent 43 and the rear vent 42 are covered by vent covers 41 which direct air flow up through the forward vent 43 into the battery box 10 and then down towards the bottom shelf 39 of the tray assembly 30. This results in road debris or water from road puddles being directed away from the batteries 11 and terminals 12. The vent covers 41 are each comprised of two flaps 45 and 44, an external flap 45, which is external to the forward face 31 or rear face 33 of the tray assembly 30, and an internal flap 44, which is internal to the forward face 31 and the rear face 33. As the vehicle 101 is driven, air is forced into the forward vent 43 and out the rear vent 42 to provide cooling to the batteries 11. The downward tilt of the external flap 45 and the internal flap 44 on the vent cover 41 on the forward vent 43 provides for the air flow upwards into the battery box 10 and then downwards towards the bottom shelf 39 of the tray assembly 30.

The battery box 10 is designed to be modular built. An entire battery system 13 (not shown) can be installed into the battery box 10 separate from a vehicle assembly line. Batteries 11 are stacked in the tray assembly 30 of the battery box 10 in sets of three with each set being held down by two hold down bolts 39 and a hold down brace 36. There is room for twelve (12) batteries 11 in the battery box 10 shown in FIGS. 1 to 3 and made in accordance with this invention for the hybrid electric medium duty International® trucks made by Navistar International Transportation Corp. Battery spacers 37 are installed between each of the batteries 11 in a set. There is a battery spacer 37 between the top battery 11 of each set and the hold down brace 36 of the set. The positioning of the batteries 11 under the hold down braces 36 and the battery spacers 37 provide air flow channels 15 for air to flow between the batteries 11 to aid in cooling of the batteries 11. In the preferred embodiment, the air flow channels 15 are at least one quarter of an inch (0.25") wide to achieve optimum cooling of the batteries 11. A battery control board 16 (not shown) and a voltage sense line fuse block 17 (not shown) of the battery system 13 are also installed within the battery box 10 to form a battery module. Fuses 18 (not shown) in the voltage sense line fuse block 17 provide ground protection for the battery system 13.

Following installation of the lid 20 the entire modular unit may be installed on the vehicle 101 on an assembly line for vehicles 101. The battery box 10 is attached to the vehicle 101 through the steel attachment plates 51 on the tray assembly 30. The attachment plates 51 are mounted to the 'L' shaped brackets 104 which are attached to a frame rail 103 of the vehicle's chassis 102.

As described above, the battery box 10 and the hybrid electric vehicle 101 with the battery box 10 installed of the present invention provides a number of advantages, some of which have been described above and others of which are inherent in the invention. Also modifications may be proposed to the battery box 10 and the hybrid electric vehicle 101 with the battery box 10 installed without departing from the teachings herein. Accordingly, the scope of the invention is only to be limited as necessitated by the accompanying claims.

We claim:

1. A battery box for a mobile vehicle with batteries of a fixed height, and a chassis with frame rails, comprising:
    (a) a tray assembly for holding the batteries;
    (b) a lid for installation onto said tray assembly to enclose the batteries and both said tray and said lid are made of steel;
    (c) a means for attachment to a frame rail of the chassis; and
    (d) both said tray assembly and said lid being coated with an elastomer with high electrical resistance.

2. The battery box of claim 1, wherein:
    (a) said elastomer coating is a combination Polyurethane and Polyurea elastomer.

3. The battery box of claim 2, wherein:
    (a) said elastomer coating is from one sixteenth to one eighth of an inch thick.

4. The battery box of claim 3, wherein said tray assembly is comprised of:
    (a) a horizontal bottom shelf;
    (b) a vertical back side engaged to said bottom shelf;
    (c) a vertical forward face and a vertical rear face, each engaged to said bottom shelf and said back side;
    (d) a forward vent in said forward face and a rear vent in said rear face; and
    (e) said forward vent and said rear vent positioned at a height below the fixed height of a battery on said bottom shelf.

5. The battery box of claim 4, wherein:
    (a) said bottom shelf of said tray assembly has drain holes.

6. The battery box of claim 5, wherein:
    (a) said forward vent and said rear vent each have vent covers; and
    (b) each said vent cover is comprised of two flaps, one flap directed downward and inward to the batteries within said tray assembly and a second flap directed downward and outward from the tray assembly.

7. The battery box of claim 6, additionally comprising:
    (a) hold down braces and hold down bolts to prevent the batteries from moving within said tray assembly; and
    (b) battery spacers for insertion between the batteries and between said hold down braces and the batteries to provide air flow channels between sets of the batteries.

8. The battery box of claim 7, wherein said air flow channels are at least 0.25 inches wide.

9. The battery box of claim 8, wherein said frame rail attachment means is comprised of:
    (a) attachment plates engaged to a bottom surface of said bottom shelf of said tray assembly; and
    (b) said attachment plates are engageable to hangers on the frame rail of the vehicle.

10. A mobile hybrid electric vehicle, comprising:
    (a) a chassis with two frame rails;
    (b) hangers engaged to one of said frame rails;
    (c) an electric motor en d to said chassis;
    (d) batteries of a fixed height for providing electric power to said motor; and (e) a battery box, comprising:
  (i) a tray assembly for holding said batteries;
  (ii) a lid for installation onto said tray assembly to enclose said batteries and
  (iii) both said tray assembly and said lid being coated with an elastomer with high electrical resistance;
  (iv) said tray assembly having a horizontal bottom shelf with a bottom surface:
  (iv) attachment plates engaged to said bottom surface; and
  (v) said attachment plates engaged to said hangers on said frame rail.

11. The hybrid electric vehicle of claim 10, wherein:
(a) said elastomer coating is a combination Polyurethane and Polyurea elastomer.

12. The hybrid electric vehicle of claim 11, wherein:
(a) said elastomer coating is from one sixteenth to one eighth of an inch thick.

13. The hybrid electric vehicle of claim 12, with said tray assembly additionally comprising:
(a) a vertical back side engaged to said bottom shelf;
(b) a vertical forward face and a vertical rear face, each engaged to said bottom shelf and said back side;
(c) a forward vent in said forward face and a rear vent in said rear face; and
(d) said forward vent and said rear vent positioned at a height below said fixed height of one of said batteries on said bottom shelf.

14. The hybrid electric vehicle of claim 13, wherein:
(a) said bottom shelf has drain holes.

15. The hybrid electric vehicle of claim 14, wherein:
(a) said forward vent and said rear vent each have vent covers; and
(b) each said vent cover is comprised of two flaps, one flap directed downward and inward to the batteries within said tray assembly and a second flap directed downward and outward from the tray assembly.

16. The hybrid electric vehicle of claim 15, wherein:
(a) hold down braces and hold down bolts to prevent said batteries from moving within said tray assembly; and
(b) battery spacers for insertion between said batteries and between said hold down braces and said batteries to provide air flow channels between sets of the batteries.

17. The hybrid electric vehicle of claim 16, wherein said air flow channels between said sets of said batteries are at least 0.25 inches wide.

* * * * *